(12) United States Patent
Katzir

(10) Patent No.: US 10,461,539 B2
(45) Date of Patent: Oct. 29, 2019

(54) CONTROLLING VOLTAGE IN ELECTRICAL POWER DISTRIBUTION GRID

(71) Applicant: Vollspark Ltd., Tel Aviv (IL)

(72) Inventor: Liran Katzir, Tel Aviv (IL)

(73) Assignee: Vollspark Ltd., Tel Aviv (IL)

( * ) Notice: Subject to any disclaimer, the term of this patent is extended or adjusted under 35 U.S.C. 154(b) by 0 days.

(21) Appl. No.: 15/888,101

(22) Filed: Feb. 5, 2018

(65) Prior Publication Data

US 2018/0226802 A1   Aug. 9, 2018
US 2018/0375331 A9   Dec. 27, 2018

(30) Foreign Application Priority Data

Feb. 7, 2017  (GB) .................... 1701964.7
Jan. 25, 2018 (WO) ................ PCT/IB2018/050441

(51) Int. Cl.
*H02J 3/38* (2006.01)
*H02M 5/293* (2006.01)
*H02J 3/46* (2006.01)

(52) U.S. Cl.
CPC ................... *H02J 3/38* (2013.01); *H02J 3/46* (2013.01); *H02M 5/293* (2013.01)

(58) Field of Classification Search
CPC ..................................... H02M 5/29
See application file for complete search history.

(56) References Cited

U.S. PATENT DOCUMENTS 2,434,493 A   1/1948  Gburski
2,992,386 A   7/1961  Rosin
(Continued)

FOREIGN PATENT DOCUMENTS

CH   118811 A    2/1927
DE   19933811 A1 2/2001
(Continued)

OTHER PUBLICATIONS

International Search Report, PCTIB2018050441 dated Apr. 5, 2018.
(Continued)

*Primary Examiner* — Jue Zhang
*Assistant Examiner* — Trinh Q Dang
(74) *Attorney, Agent, or Firm* — Dr. Hanan Farber Patent Agent Ltd.

(57) ABSTRACT

Control of grid voltage in a power grid. A power transformer converts alternating current (AC) electrical power at a higher voltage on the primary leads to AC electrical power at a lower grid voltage on the secondary leads. An auxiliary AC/AC power converter converts input AC electrical power at the input conductors to output AC electrical power at the output conductors, The auxiliary AC/AC power converter converts substantially less electrical power than the AC electrical power converted by the power transformer. The secondary leads of the power transformer are series-connected to the output conductors of the auxiliary AC/AC power converter. Input conductors of the auxiliary AC/AC power converter are parallel-connected to either (i) the primary leads of the power transformer, or (ii) the secondary leads of the power transformer. The output alternating voltage of the auxiliary AC/AC power converter adds to the output alternating voltage of the power transformer to control the grid voltage in the power grid.

12 Claims, 12 Drawing Sheets

(56) References Cited

U.S. PATENT DOCUMENTS

| | | | |
|---|---|---|---|
| 3,295,053 A | 12/1966 | Perrins | |
| 4,896,092 A | 1/1990 | Flynn | |
| 7,304,872 B1 * | 12/2007 | Yakymyshyn | H02M 5/06 |
| | | | 307/140 |
| 2015/0008739 A1 * | 1/2015 | Albu | H02M 5/458 |
| | | | 307/23 |
| 2015/0256092 A1 * | 9/2015 | Garrity | H02J 3/383 |
| | | | 363/37 |
| 2015/0303792 A1 | 10/2015 | Kim | |
| 2017/0027027 A1 | 1/2017 | Doebbler et al. | |

FOREIGN PATENT DOCUMENTS

| | | |
|---|---|---|
| DE | 102012108363 A1 | 9/2007 |
| DE | 2010040969 A1 | 3/2012 |
| WO | WO2007108427 A1 | 3/2007 |

OTHER PUBLICATIONS

Written Opinion of the ISA, PCTIB2018050441, dated Apr. 5, 2018.
Kaniewski et al., Hybrid Voltage Sag/Swell Compensators, IEEE Industrial Electronics Magazine, Dec. 21, 2015, pp. 37-48.
Ishmilovitz, Doron, Time variable transformers operating at a near-unity transfer ratio and some possible applications IEE Proceedings online No. 20040360 doi:10.1049/ip-epa20040360 Paper first received Feb. 4, 2003 and in revised form Sep. 24, 2003 IEE Proc.-Electr. Power Appl., vol. 151, No. 2, Mar. 2004.

\* cited by examiner

CONTROLLING VOLTAGE IN ELECTRICAL POWER DISTRIBUTION GRID

BACKGROUND

1. Technical Field

The present invention relates to controlling the electrical power distribution grid.

2. Description of Related Art

North America's electricity infrastructure represents more than $1 trillion U.S. dollars (USD) in asset value and includes over 360,000 miles of transmission lines, including approximately 180,000 miles of high-voltage lines, connecting over 6,000 power plants. Power transformers are a critical component of the electrical power grid, because power transformers adjust the electric voltage to a suitable level on each segment of the power transmission from generation to the end user. The power transformer steps up voltage at generation for efficient, long-haul transmission of electricity and steps voltage down for local distribution to customers.

In recent years, there has been an ever increasing penetration of distributed and renewable energy sources such as solar panels and wind turbines to the electrical power grid. These energy sources cause local voltage instabilities in the electrical power grid as they contribute power in various locations of the grid without central control.

Thus, there is a need for and it would be advantageous to have an improved system/method for controlling the electrical distribution grid.

BRIEF SUMMARY

Various methods and systems are disclosed herein for controlling grid voltage in a power grid, including a power transformer with primary leads and secondary leads. The power transformer is configured to convert alternating current (AC) electrical power at a higher voltage on the primary leads to AC electrical power at a lower grid voltage on the secondary leads. An auxiliary AC/AC power converter is provided with input conductors and output conductors. The auxiliary AC/AC power converter is configured to convert input AC electrical power at the input conductors to output AC electrical power at the output conductors. The auxiliary AC/AC power converter is configured to convert substantially less electrical power than the AC electrical power converted by the power transformer. The secondary leads of the power transformer are series-connected to the output conductors of the auxiliary AC/AC power converter. Input conductors of the auxiliary AC/AC power converter are parallel-connected to either (i) the primary leads of the power transformer, or (ii) the secondary leads of the power transformer. The output alternating voltage of the auxiliary AC/AC power converter adds to the output alternating voltage of the power transformer to control the grid voltage in the power grid. The auxiliary AC/AC power converter may be an auxiliary transformer. The input conductors to the auxiliary transformer are connectable through multiple switches to either (i) the primary leads of the power transformer, or (ii) the secondary leads of the power transformer. The switches may be configurable to select an anti-parallel connection between the input conductors to the auxiliary transformer and either of (i) the primary leads of the power transformer, or (ii) the secondary leads of the power transformer. The power converter may be a switched-mode AC/AC converter configurable to invert the output alternating voltage relative to the input alternating voltage or non-invert the output alternating voltage relative to the input alternating voltage. The power converter may be a switched-mode AC/AC converter configurable to shift by 180 degrees output phase of the AC electrical power at the output conductors relative to input phase of the AC electrical power at the input conductors. The power transformer may include three or more primary leads and three or more corresponding secondary leads configured to output different phases. The output conductors of the auxiliary AC/AC power converter are configured to output different phases corresponding to the phases of the multiple secondary leads of the power transformer. One or more electrical parameters may be sensed at the output after the series-connection of the secondary leads of the power transformer to the output conductors of the auxiliary AC/AC power converter. The sensed electrical output parameter may be: total alternating voltage of the auxiliary AC/AC power converter summed with the output alternating voltage of the power transformer, current and/or phase. A control module may be connected to the sensor The control module is configured to provide a control signal to the auxiliary AC/AC power converter and/or the control module is configured to provide a control signal to the switches responsive to the sensed parameter(s). A communications module may receive remotely a control parameter and provide a monitoring signal remotely with respect to the status of the system for controlling grid voltage in the power grid.

Various methods and systems are disclosed herein for controlling grid voltage in a power grid, including a power transformer with primary leads and secondary leads. The power transformer is configured to convert alternating current (AC) electrical power at a higher voltage on the primary leads to AC electrical power at a lower grid voltage on the secondary leads. An auxiliary AC/AC power converter is provided with input conductors and output conductors. The auxiliary AC/AC power converter is configured to convert input AC electrical power at the input conductors to output AC electrical power at the output conductors. The auxiliary AC/AC power converter is configured to convert substantially less electrical power than the AC electrical power converted by the power transformer. The secondary leads of the power transformer are parallel-connected to the output conductors of the auxiliary AC/AC power converter. Input conductors of the auxiliary AC/AC power converter are series-connected to either (i) the primary leads of the power transformer, or (ii) the secondary leads of the power transformer. The output alternating voltage of the auxiliary AC/AC power converter adds to the output alternating voltage of the power transformer to control the grid voltage in the power grid.

Various methods and systems are disclosed herein for controlling grid voltage in a power grid, including a power line with input leads and output leads. The power line is configured to carry alternating current (AC) electrical power between the input leads and the output leads. An auxiliary AC/AC power converter is provided with input conductors and output conductors. The auxiliary AC/AC power converter is configured to convert input AC electrical power at the input conductors to output AC electrical power at the output conductors. The auxiliary AC/AC power converter is configured to convert substantially less electrical power than the power being carried by the power line. The output leads of the power line are parallel-connected to the output conductors of the auxiliary AC/AC power converter. Input conductors of the auxiliary AC/AC power converter are series-connected to the input leads of the power line. The output alternating voltage of the auxiliary AC/AC power converter adds to the output alternating voltage of the power line to control the grid voltage in the power grid.

Various methods and systems are disclosed herein for controlling grid voltage in a power grid, including a power line with input leads and output leads. The power line is configured to carry alternating current (AC) electrical power between the input leads and the output leads. An auxiliary AC/AC power converter is provided with input conductors and output conductors. The auxiliary AC/AC power converter is configured to convert input AC electrical power at the input conductors to output AC electrical power at the output conductors. The auxiliary AC/AC power converter is configured to convert substantially less electrical power than the power being carried by the power line. The output leads of the power line are series-connected to the output conductors of the auxiliary AC/AC power converter. Input conductors of the auxiliary AC/AC power converter are parallel-connected to the input leads of the power line. The output alternating voltage of the auxiliary AC/AC power converter adds to the output alternating voltage of the power line to control the grid voltage in the power grid.

BRIEF DESCRIPTION OF THE DRAWINGS

The invention is herein described, by way of example only, with reference to the accompanying drawings, wherein.

Figure 1A:
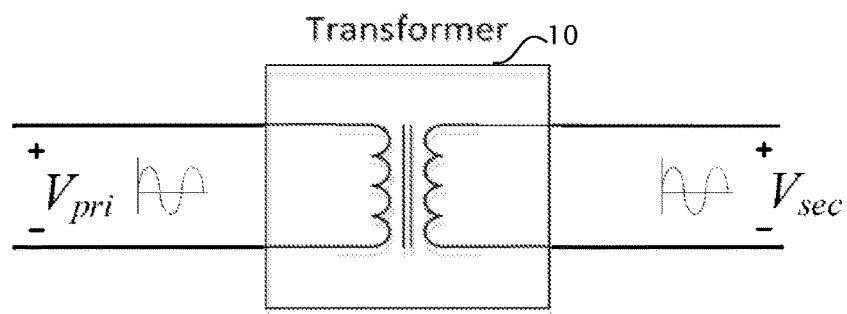
FIG. 1A illustrates a schematic drawing of a conventional single phase transformer.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, aspects of the present invention are directed to use of a system including a power transformer and an auxiliary AC/AC power converter. The auxiliary AC/AC power converter may be a smaller power transformer or a switched-mode AC/AC power converter. The power transformer converts most of the power, and the switched-mode AC/AC power converter is configured to adjustably convert a relatively low power, e.g. up to about 5% of the total power being converted. Different embodiments of the present invention may be configured as a new manufactured unit or as a retrofit of existing and/or already installed power transformers with relative low cost and complexity. Moreover, the proposed system, according to features of the present invention may be used, at least to some extent, to reduce harmonics and to regulate three phase load unbalance.

Referring now to the drawings, reference is now made to FIG. 1A which illustrates a schematic drawing of a conventional single phase transformer 10 being used for instance in the electrical power grid. For simplicity sake, the following analysis is done for a single phase transformer with a unity power factor load (Q=0). A similar analysis may be performed for a three-phase transformer and a non-unity load. The ratio between input voltage, $V_{pri}$, and the output voltage, $V_{sec}$, is a.

$$V_{pri} = a \cdot V_{sec} \qquad (1)$$
$$V_{sec} = \frac{1}{a} \cdot V_{pri}$$

Let's define the efficiency of the transformer as $\eta_1$, then the power equation is:

$$\frac{P_{sec}}{P_{pri}} = \eta_1 \qquad (2)$$
$$V_{sec} \cdot I_{sec} = \eta_1 \cdot V_{pri} \cdot I_{pri}$$

Figure 1B:
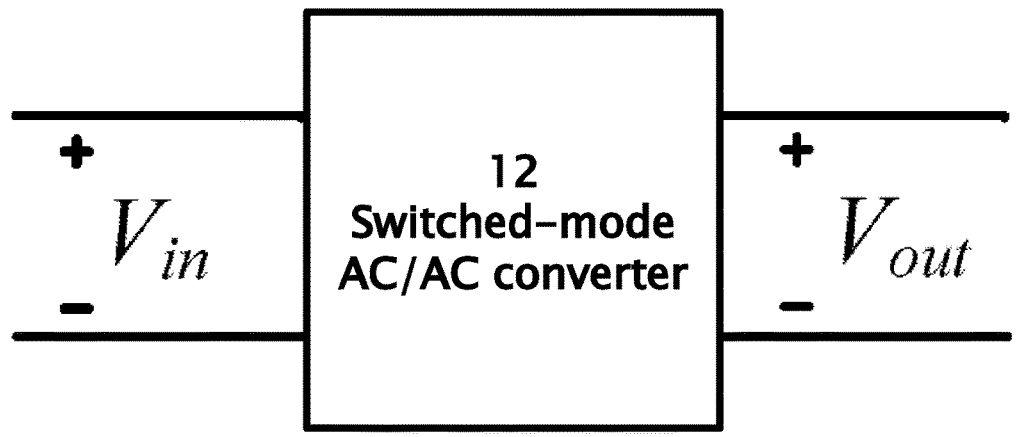
FIG. 1B illustrates a schematic drawing of a switched mode AC/AC converter, according to features of the present invention.

Reference is now made to FIG. 1B which illustrates a schematic drawing of a switched mode AC/AC converter 12, according to features of the present invention. AC/AC converter 12 may be a high frequency, bi-directional switched mode converter operating at frequency, e.g. ~250 kiloHertz, much higher than the grid or line frequency, e.g. 50-60 Hertz. Therefore, at the line frequency, switched mode AC/AC converter 12 may be modelled as a transformer.

The ratio between input voltage, $V_{in}$, and the output voltage, $V_{out}$, is k.

$$V_{in} = k \cdot V_{out} \qquad (3)$$
$$V_{out} = \frac{1}{k} \cdot V_{in}$$

Let's define the efficiency of AC/AC converter 12 as $\eta_2$, then the power equation of AC/AC converter 12 is:

$$\frac{P_{out}}{P_{in}} = \eta_2 \qquad (4)$$
$$V_{out} \cdot I_{out} = \eta_2 \cdot V_{in} \cdot I_{in}$$

Figure 2:
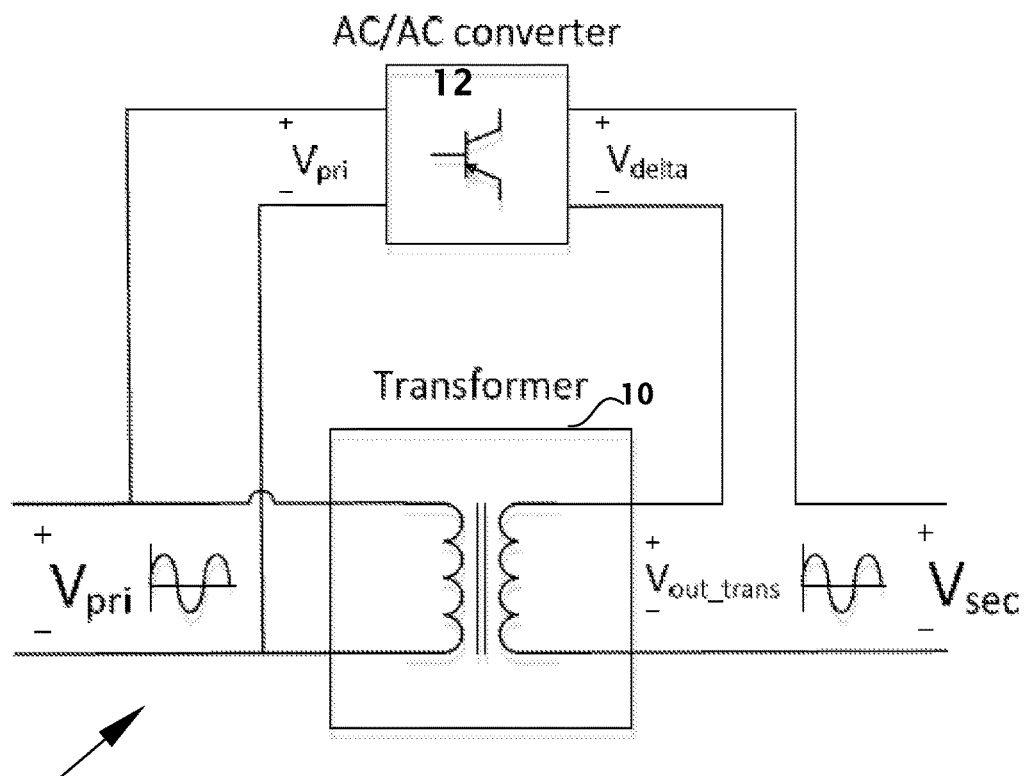
FIG. 2 illustrates a hybrid power converter, according to features of the present invention.

Reference is now made also to FIG. 2, which illustrates a hybrid power converter 20, according to an embodiment of the present invention. Hybrid power converter 20 may include a power electronics unit, e.g. bi-directional AC/AC converter 12, to an existing transformer, e.g. single phase transformer 10, by way of example. By connecting the output of the AC/AC converter 12 in series with the output of transformer 10, and the respective inputs in parallel, voltage control of the output voltage $V_{sec}$ of hybrid power converter 20 may be achieved.

In this case, the output voltage of the system is:

$$V_{sec} = V_{out\_trans} + V_{delta} = \frac{1}{a} \cdot V_{pri} + \frac{1}{k} \cdot V_{pri} = \left(\frac{1}{a} + \frac{1}{k}\right) \cdot V_{pri} \quad (5)$$

The output power of hybrid power converter 20 is:

$$P_{out} = V_{sec} \cdot I_{out} = \left(\frac{1}{a} + \frac{1}{k}\right) \cdot V_{pri} \cdot I_{out} \quad (6)$$

The output power of AC/AC converter 12 is:

$$P_{out\_AC/AC} = \frac{1}{k} V_{pri} \cdot I_{out} \quad (7)$$

The input power of AC/AC converter 12 is:

$$P_{in\_AC/AC} = \frac{1}{k \cdot \eta_2} V_{pri} \cdot I_{out} \quad (8)$$

The output power of transformer 10 is:

$$P_{out\_trans} = \frac{1}{a} V_{pri} \cdot I_{out} \quad (9)$$

The input power of transformer 10 is:

$$P_{in\_trans} = \frac{1}{a \cdot \eta_1} V_{pri} \cdot I_{out} \quad (10)$$

The ratio between the power going into AC/AC converter 12 and the power going through transformer 10 is:

$$\frac{P_{in\_AC/AC}}{P_{in\_trans}} = \frac{\frac{1}{k \cdot \eta_2} V_{pri} \cdot I_{out}}{\frac{1}{a \cdot \eta_1} V_{pri} \cdot I_{out}} = \frac{a \cdot \eta_1}{k \cdot \eta_2} \quad (11)$$

This means that the power partition between AC/AC converter 12 and transformer 19 is approximately linear with the voltage ratio between the two devices, assuming reasonably high efficiencies of both transformer 10 and AC/AC converter 12. If we would like to control within +/−5% of output voltage $V_{sec}$, the maximum power that the AC/AC converter 12 handles is about 5% of the power being handled by transformer 10.

The input power of hybrid power converter 20:

$$P_{in} = \frac{1}{k \cdot \eta_2} V_{pri} \cdot I_{out} + \frac{1}{a \cdot \eta_1} V_{pri} \cdot I_{out} = \left(\frac{1}{k \cdot \eta_2} + \frac{1}{a \cdot \eta_1}\right) V_{pri} \cdot I_{out} \quad (12)$$

Total efficiency of the hybrid power converter 20:

$$\eta_T = \frac{P_{out}}{P_{in}} = \frac{\left(\frac{1}{a} + \frac{1}{k}\right) \cdot V_{pri} \cdot I_{out}}{\left(\frac{1}{k \cdot \eta_2} + \frac{1}{a \cdot \eta_1}\right) \cdot V_{pri} \cdot I_{out}} = \quad (13)$$

$$\frac{\frac{k+a}{k \cdot a}}{\frac{a \cdot \eta_1 + k \cdot \eta_2}{k \cdot a \cdot \eta_1 \cdot \eta_2}} = \frac{\eta_1 \cdot \eta_2}{(k+a) \cdot (a \cdot \eta_1 + k \cdot \eta_2)}$$

Figure 3:
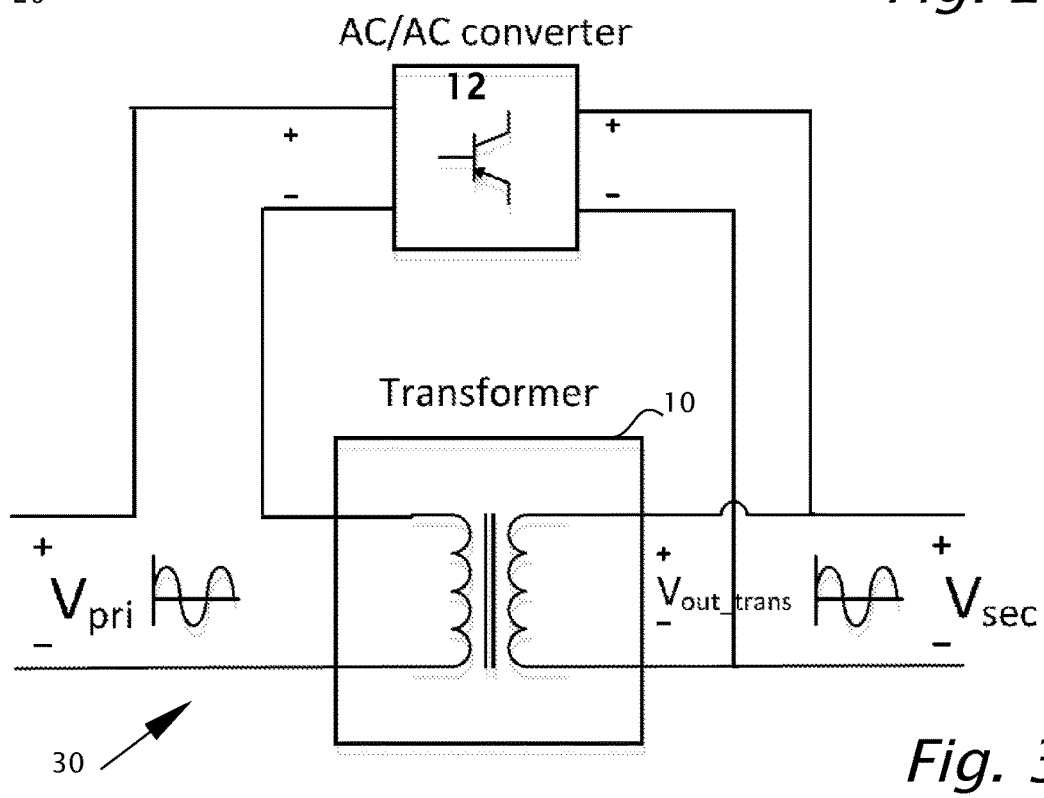
FIG. 3 illustrates a hybrid power converter according to further features of the present invention.

Reference is now made to FIG. 3, which illustrates a hybrid power converter 30, according to further features of the present invention. Hybrid power converter 30 may include a power electronics unit, e.g. bi-directional AC/AC converter 12 connected to a transformer, e.g. single phase transformer 10, by way of example. Hybrid power converter 30 is similar to hybrid power converter 20 with connections reversed between input and output. The input of AC/AC converter 12 is connected in series with the input of transformer 10. The respective outputs of AC/AC converter 12 and transformer 10 are connected in parallel. However, the respective input voltages of AC/AC converter 12 and transformer 10 are different. Thus, voltage control of the output voltage $V_{sec}$ of hybrid power converter 30 may be achieved.

Figure 4:
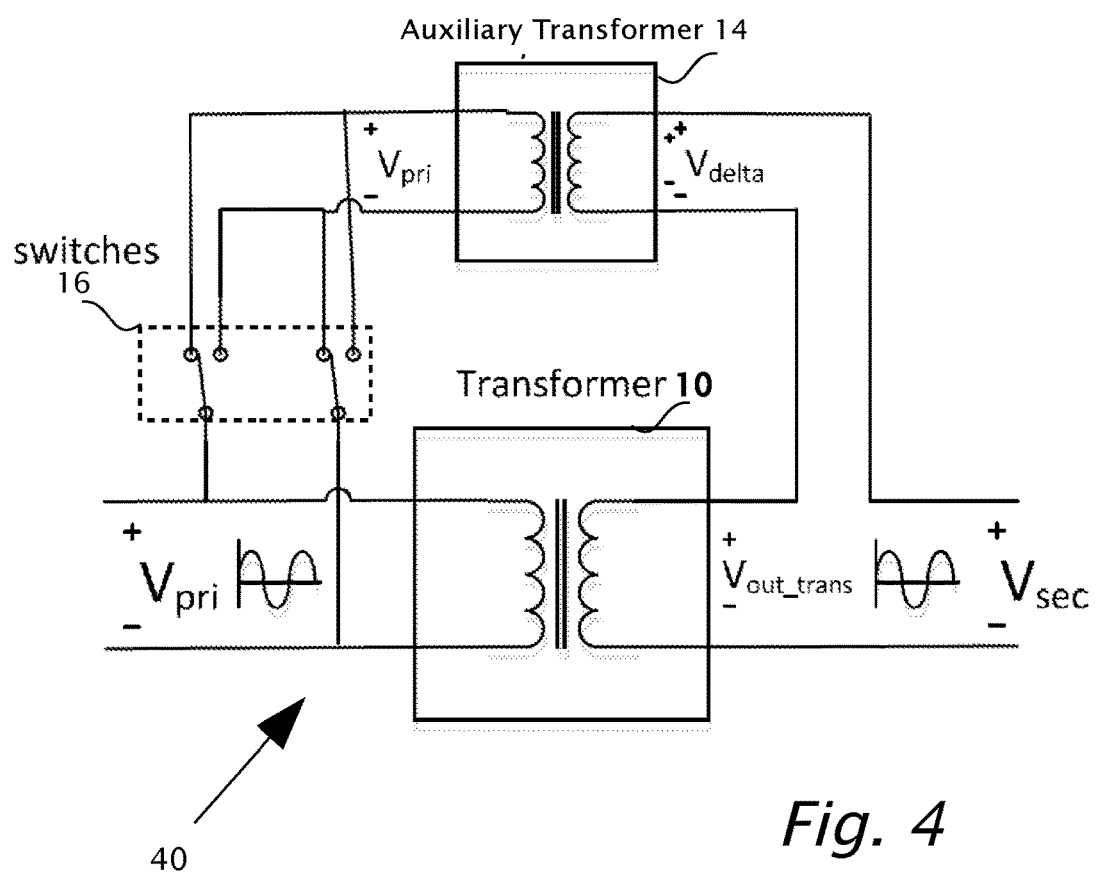
FIG. 4 illustrates a power converter, according to further features of the present invention.

Reference is now made to FIG. 4, which illustrates a power converter 40, according to further features of the present invention. Power converter 40 includes primary transformer 10 output connected in series with the output of an auxiliary transformer 14. Respective inputs of power converter 40 and primary transformer 10 are connected in parallel, optionally through switches 16. Switches 16 allow the inputs to be connected in parallel plus-to-plus, minus-to-minus or anti-parallel minus-to-plus and plus-to-minus. Auxiliary transformer 14 is configured to have a larger turns ratio than the turns ratio the primary transformer 10. As an example, primary transformer 10 converts from 22 kiloVolt root-mean-square (RMS) at its input to 400V RMS. Auxiliary transformer 14 is configured to convert from 22 kiloVolt at its input to 20 Volt at its output. Only a small part of the total converted power goes through auxiliary transformer 14 and thus auxiliary transformer 14 may be much smaller than primary transformer 10. In this example, with use of the switches 16, total output voltage $V_{sec}$ may be: (i) 420 Volt RMS when the respective inputs are connected in parallel, (ii) 400 Volt when auxiliary transformer 14 is disconnected at the input or (iii) 380 Volt when the inputs are connected in anti-parallel.

Figure 5:
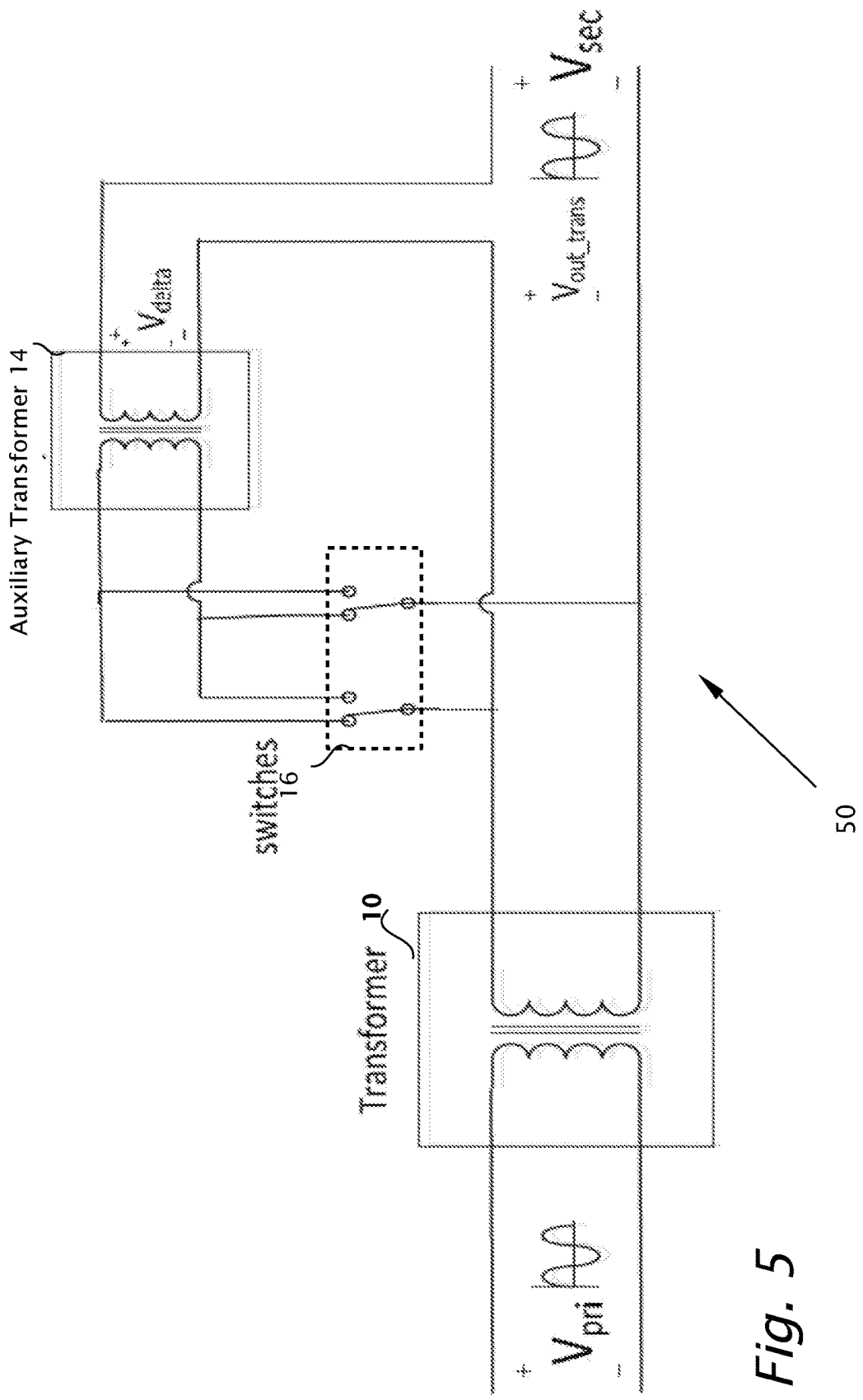
FIG. 5 illustrates a power converter, according to further features of the present invention.

Reference is now made to FIG. 5, which illustrates a power converter 50, according to further features of the present invention. In power converter 50, auxiliary transformer 14 is shown connected at its inputs to the outputs of transformer 10 through switches 16 so that the connections at the inputs to auxiliary transformer 14 to the outputs of transformer 10 may be parallel, anti-parallel or disconnected. The respective outputs of auxiliary transformer 14 and transformer 10 are shown connected in series. Using the example as in power converter 40 (FIG. 4), the conversion of auxiliary transformer 14 or the converter may be from 400 Volts at its input to 20 Volts at its output. The total voltage $V_{sec}$ of the series-connected outputs of transformer 10 and auxiliary transformer 14 is: 420V, 400V or 380V depending on configuration of switches 16.

Figure 6:
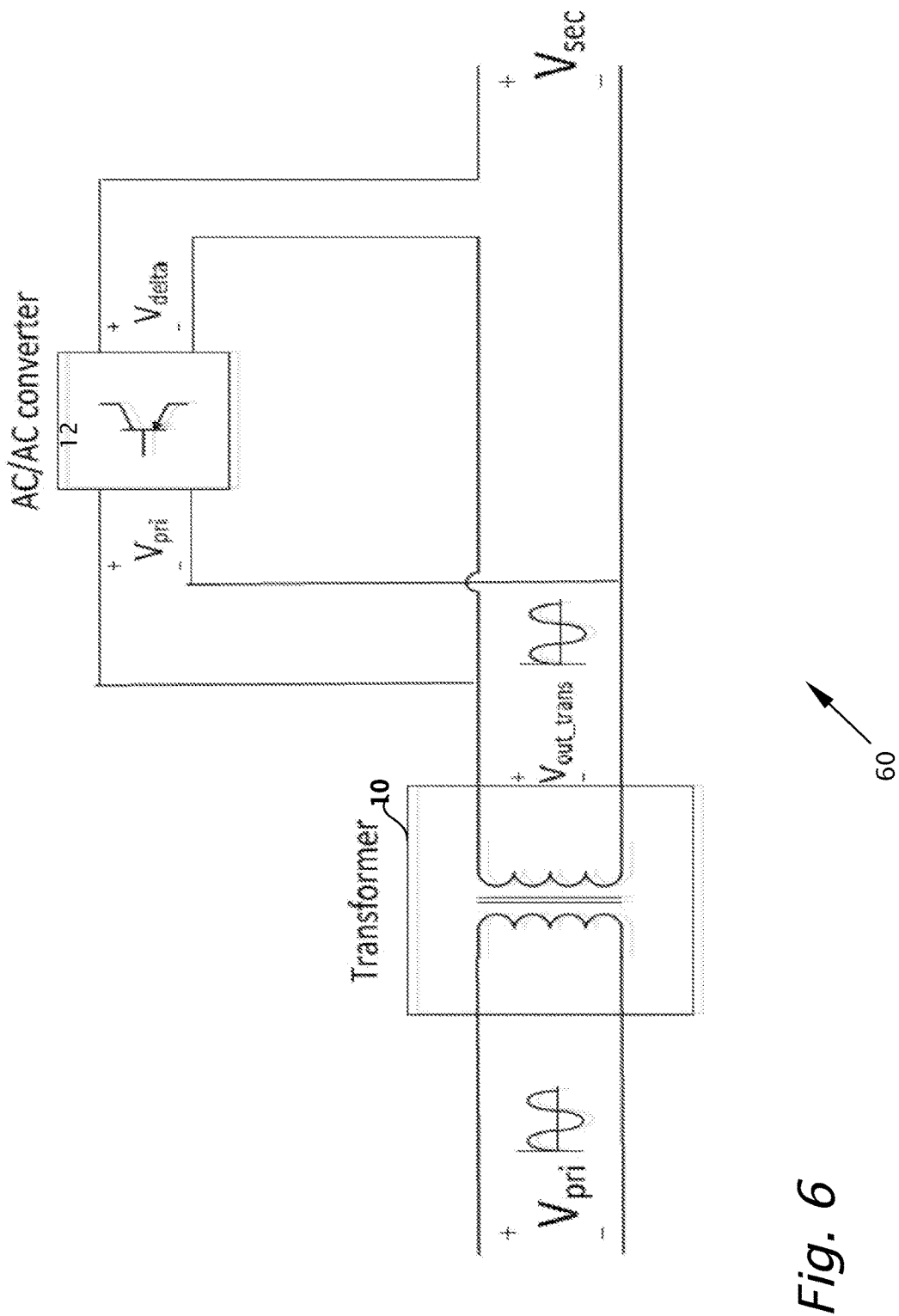
FIG. 6 illustrates a power converter, according to further features of the present invention.

Reference is now made to FIG. 6, which illustrates a power converter 60, according to further features of the present invention which is similar to power converter 50 with use of a switching power converter 12 instead of auxiliary transformer 14. In power converter 60, switching power converter 12 is shown connected at its inputs to the outputs of transformer 10. The respective outputs of transformer 10 and power converter 12 are series-connected. Switching power converter 12 is configured to handle a small fraction of the total power and may be used to adjust total output voltage $V_{sec}$.

Figure 7:
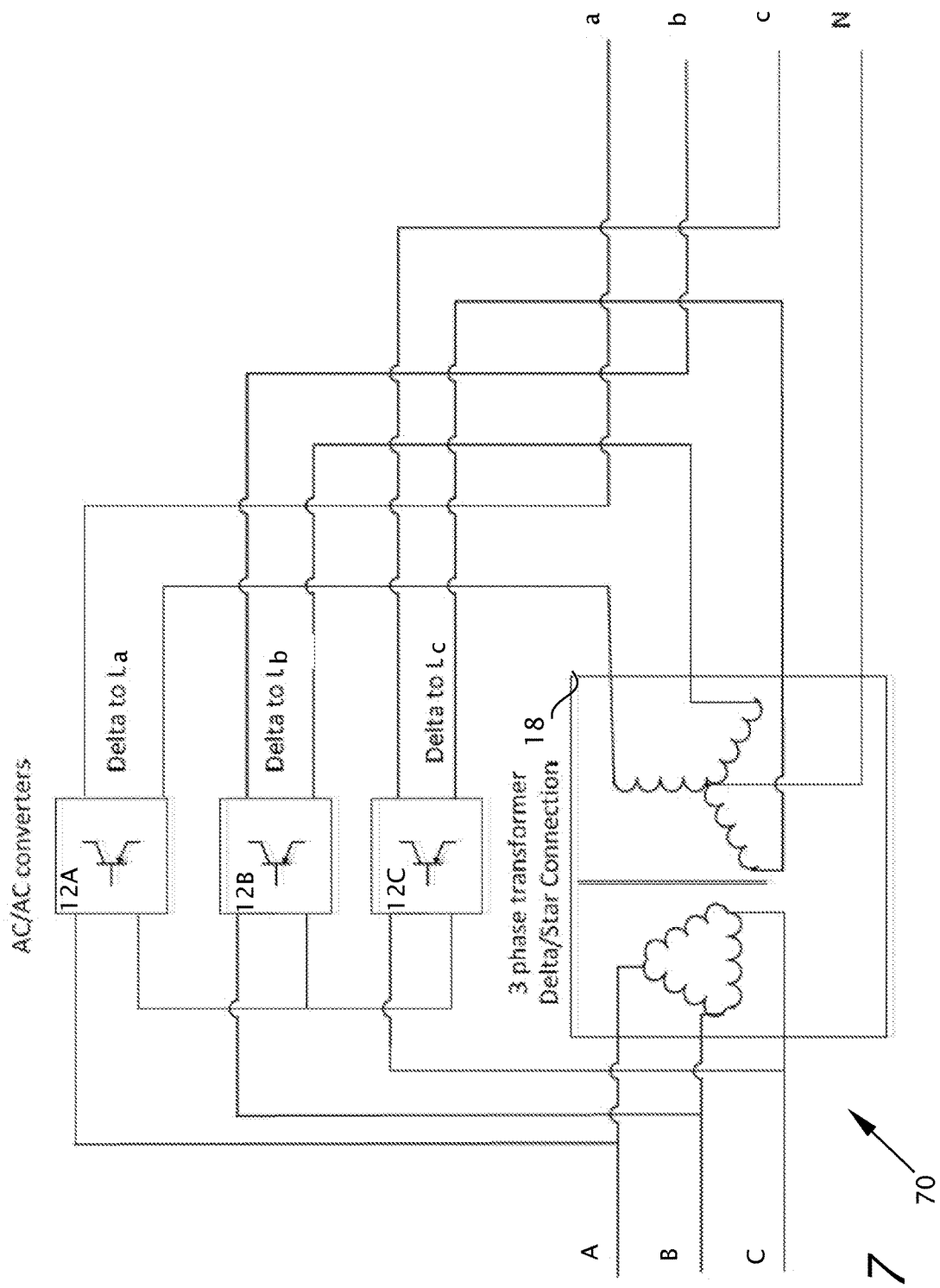
FIG. 7 illustrates a power converter, according to further features of the present invention.

Reference is now made to FIG. 7, which illustrates a power converter 70, including further features of the present invention. Power converter 70 includes a three-phase transformer 18 shown in a Delta/Star configuration. The primary is shown wired in a Delta configuration and the secondary is shown wired in a Star configuration. The primary leads are referenced A,B and C. Secondary leads are labelled a,b, c and neutral lead N. Three switched mode AC/AC converters are referenced 12A, 12B and 12C. First inputs of switching AC/AC converters 12A, 12B and 12C are connected respectively to high voltage primary leads A,B and C. Second inputs of switched mode AC/AC converters 12A, 12B and 12C are tied together. Outputs of switching AC/AC converters 12A, 12B and 12C series-connected to secondary leads a,b and c respectively so that switching AC/AC converters 12A, 12B and 12C provide adjustments to output voltages on secondary leads a,b, and c.

Figure 8:
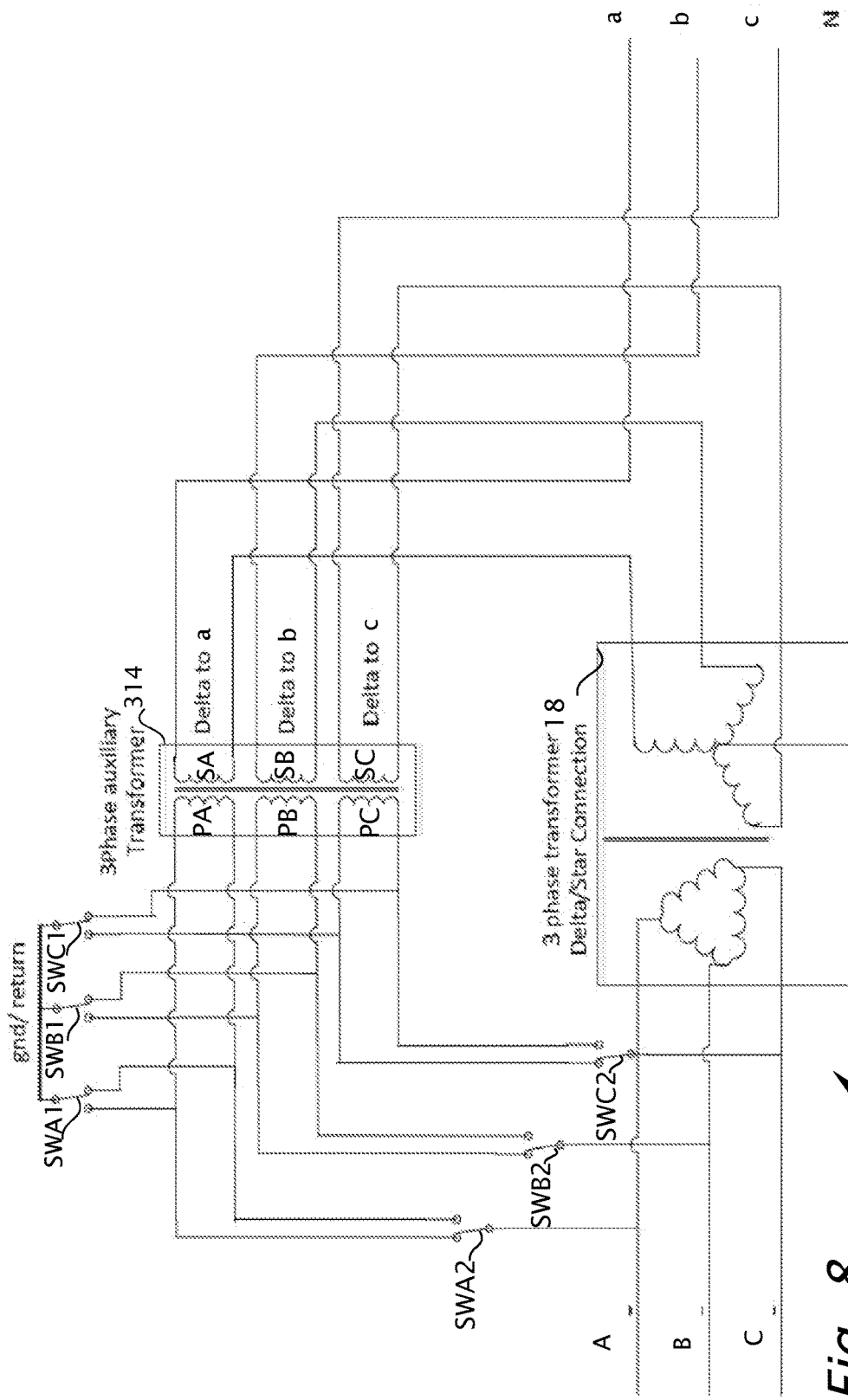
FIG. 8 illustrates a power converter, according to further features of the present invention.

Reference is now made to FIG. 8, which illustrates a power converter 80, including further features of the present invention. As in power converter 70 (FIG. 7), power converter 80 includes three-phase transformer 18 shown in a Delta/Star configuration. The primary of three-phase transformer 18 is shown wired in a Delta configuration and the secondary is shown wired in a Star configuration. The primary leads are referenced A,B and C. Secondary leads are labelled a,b, c and neutral lead N.

A three phase auxiliary transformer 314 is shown with three primary coils PA, PB, PC and three secondary coils SA, SB and SC respectively. Associated with primary coils PA, PB, PC are switches SWA1, SWA2, SWB1, SWB2, SWC1 and SWC2.

Switches SWA2, SWB2 and SWC2 determine which of the two input leads of respective primary coils PA,PB,PC connect to respective high-voltage primary leads A,B and C.

Switches SWA1, SWB1 and SWC1 are used to interconnect the other input leads of primary coils PA,PB,PC, that are the input leads not connected to any of high-voltage primary leads A,B and C.

Secondary coils SA, SB and SC are series-connected to secondary leads a,b and c respectively so that voltage outputs from secondary coils SA, SB and SC provide adjustments respectively to total output voltages on secondary leads a,b, and c.

The adjustments may be individually positive or negative dependent on the state of switches as described above. The adjustment may be zero when a primary coil PA, PB, PC is not connected to a respective high-voltage primary lead A,B and C.

Figure 9:
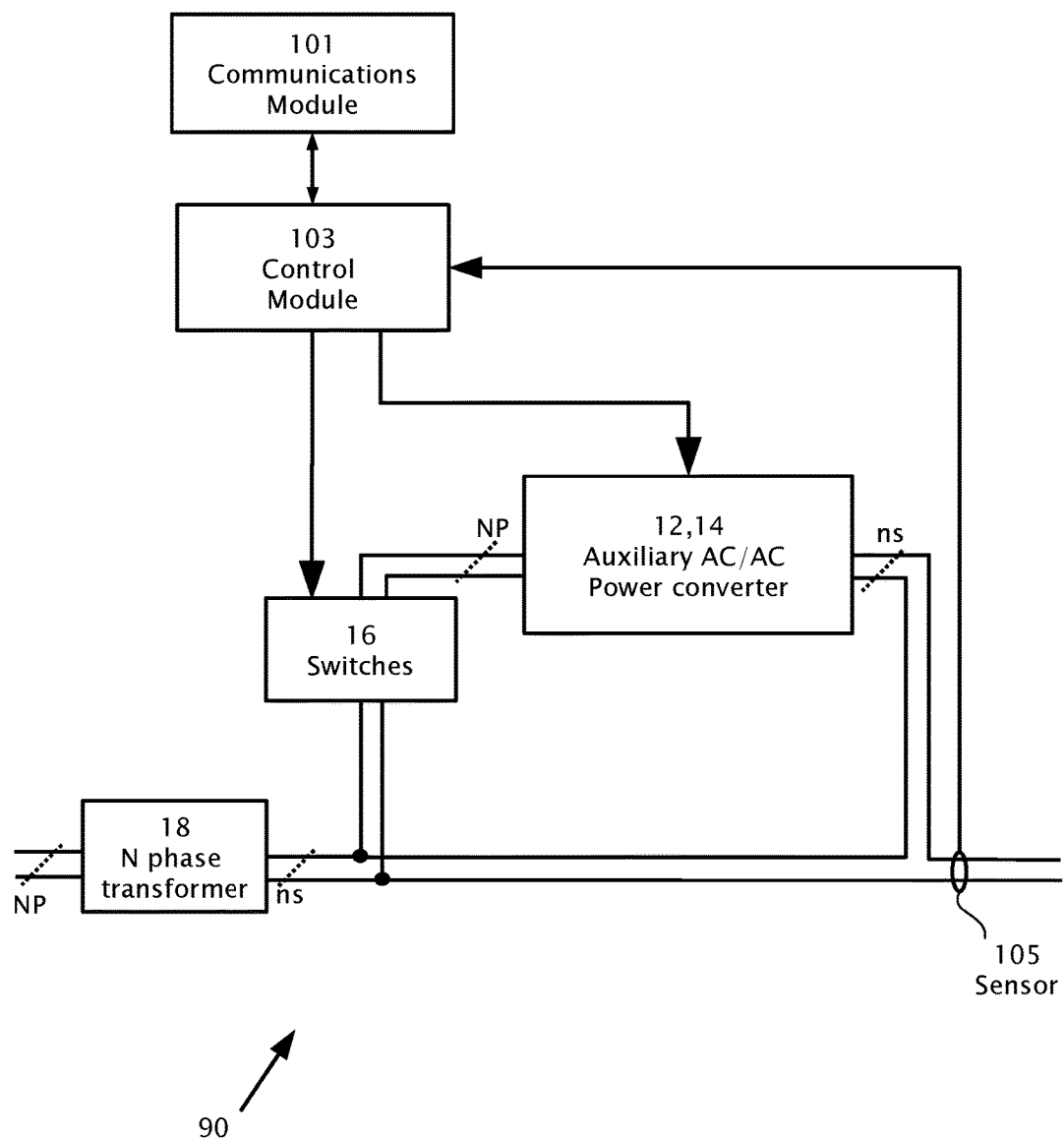
FIG. 9 illustrates a power converter, according to further features of the present invention.

Reference is now also made to FIG. 9 which illustrates schematically a power converter 90 according to further features of the present invention. Power converter 90 includes a N-phase transformer 18, which may be single phase, or three-phase or higher phase. Power converter 90 includes an auxiliary AC/AC power converter, either an auxiliary transformer 14 or switched-mode AC/AC power converter 12. Switches 16 are optional for use with auxiliary transformer 14. When switched-mode AC/AC power converter 12 is used, switches 16 are normally implemented internally. By way of example, power converter 90 is shown with a parallel connection between N secondary leads ns of power transformer 18 and N primary conductors NP of auxiliary AC/AC power converter 12,14; and a series connection between secondary leads ns of power transformer 18 and N secondary conductors ns of auxiliary AC/AC power converter 12,14. The total voltage after series-connection is the sum of the voltage outputs of both auxiliary AC/AC power converter 12,14 and transformer 18. One of more sensors 105 are shown at the output after the series-connection which may be a voltage sensor, current sensor and/or phase sensor for each phase N. Signals from sensors 105 are received by a control module 103. Control module 103, responsive to a signal from one or more sensors 105 may provide one or more control signals to auxiliary AC/AC power converter 12,14 and/or to switches 16 to maintain the grid voltage, current, phase and/or load balance between phases within specified values. Power converter 90 further includes a communications module 101 configured to receive control parameters optionally from a remote location.

Figure 10:
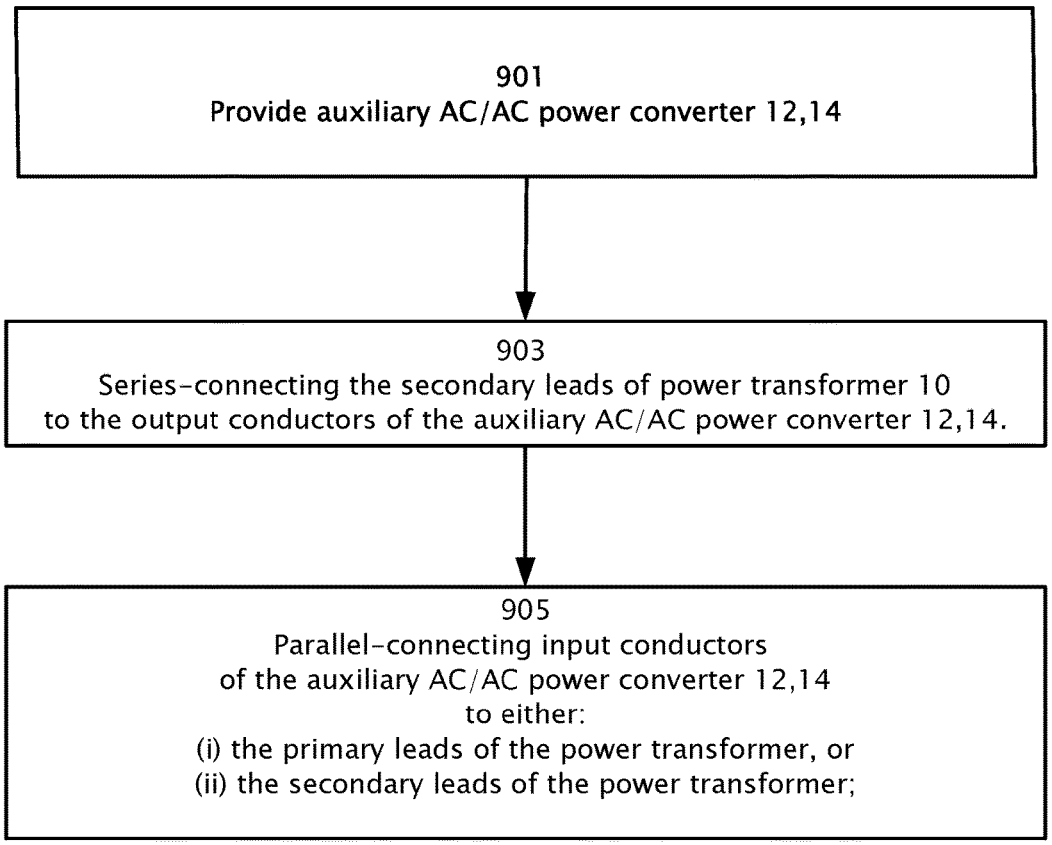
FIG. 10 shows a flowchart of a method, according to features of the present invention.

Reference is now also made to FIG. 10 which illustrates a method 100 including further features of the present invention. Method 100 may be a retrofit onto an existing power grid or may include a process of constructing a new power grid. In step 901, an auxiliary AC/AC power converter 12,14 is provided. In step 903, the secondary leads of power transformer 10,18 are series-connected to the output conductors of the auxiliary AC/AC power converter 12,14. In step 903, input conductors auxiliary AC/AC power converter 12,14 are parallel-connected to either: (i) the primary leads of the power transformer, or (ii) the secondary leads of power transformer 10,18.

Referring back to FIGS. 1B, 2, 3, 6, and 7, according to features of the present invention, switched mode converter 12 may operate at a switching frequency of a few hundred kiloHertz. Thus, passive components of switched mode converter 12 may quite small, inductors with inductance of microHenries and capacitors of capacitance of order of magnitude of 10 microFarads. Dynamics of switched mode converter 12 are in the order of 100s of microseconds, orders of magnitude faster than the line frequency 50-60 Hertz. This means that line voltage may be corrected even within the line cycle, implying that in a real-time control system, voltage harmonics may be compensated to attain a nearly harmonics free sinusoidal voltage.

Figure 11:
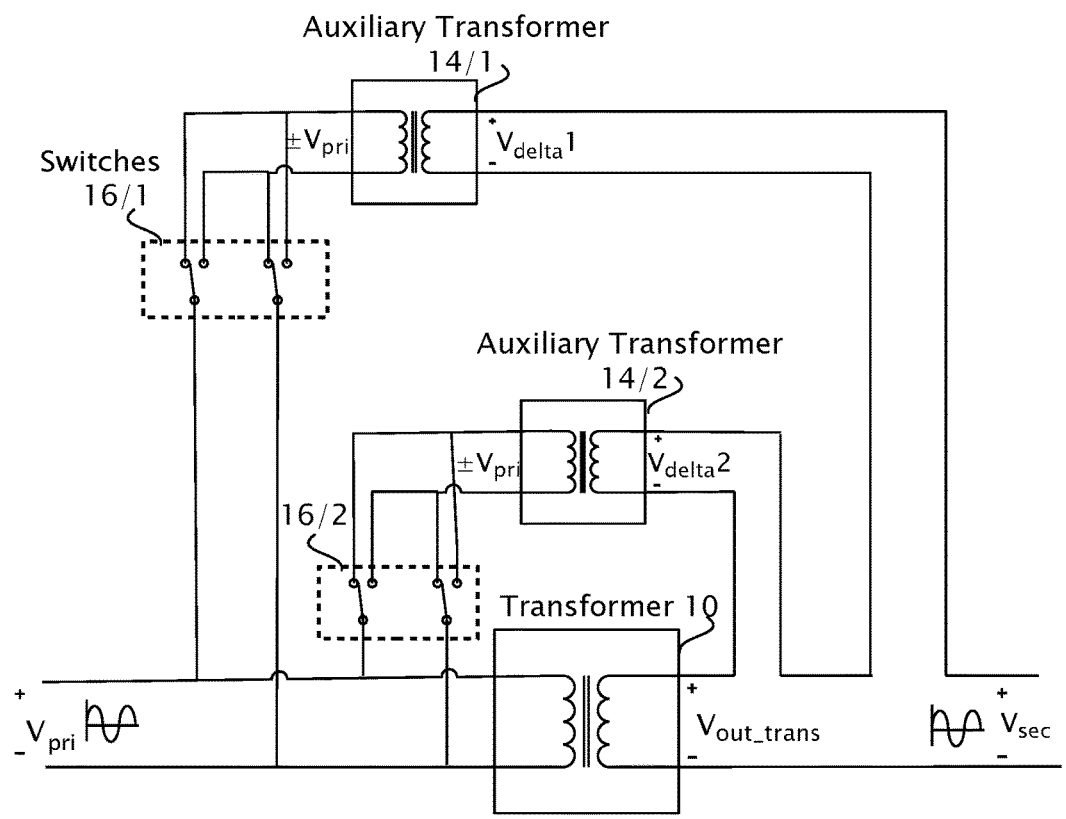
FIG. 11 illustrates a power converter with configuration similar to that of FIG. 4, with two auxiliary transformers, according to further features of the present invention.

Reference is now made to FIG. 11 which illustrates, a power converter 110 with configuration similar to that of FIG. 4, with two auxiliary transformers 14/1 and 14/2, according to further features of the present invention.

Power converter 110 includes primary transformer 10 output connected in series with the outputs of auxiliary transformers 14/1 and 14/2. Respective inputs of auxiliary transformers 14/1 and 14/2 and primary transformer 10 are connected in parallel, optionally through switches 16/1 and 16/2 respectively. Switches 16/1 and 16/2 allow the respective inputs to be connected in parallel plus-to-plus, minus-to-minus or anti-parallel minus-to-plus and plus-to-minus. Auxiliary transformer 14/1 and 14/2 are configured to have a larger turns ratio than the turns ratio the primary transformer 10. Only a small part of the total converted power goes through auxiliary transformers 14/1 and 14/2 and thus auxiliary transformer 14/1 and 14/2 may be much smaller than primary transformer 10.

By connecting the respective outputs of auxiliary transformers 14/1 and 14/2 in series with the output of power transformer 10, voltage control of the output voltage of system 110 may be achieved.

In this case, the output voltage $V_{sec}$ of system 110 is the sum of the output voltage $V_{out\_trans}$ of transformer 10, output voltage $V_{delta1}$ of auxiliary transformer 14/1 and output voltage $V_{delta2}$ of auxiliary transformer 14/2.

$$V_{sec} = V_{out\_trans} + V_{delta1} + V_{delta2} = \frac{1}{a}V_{pri} \cdot \frac{1}{k_1} \pm V_{pri} \cdot \frac{1}{k_2} \pm V_{pri} \quad (14)$$

In system 110, it is possible to get nine different levels of voltage $V_{sec}$ on the output:

1. $V_{sec}=V_{pri}$, both auxiliary transformers 14/1 and 14/2 are short-circuited at the respective primaries
2. $V_{sec}=V_{pri}+V_{delta1}$, auxiliary transformer 14/2 is short circuited
3. $V_{sec}=V_{pri}-V_{delta1}$, auxiliary transformer 14/2 is short circuited
4. $V_{sec}=V_{pri}+V_{delta2}$, auxiliary transformer 14/1 is short circuited
5. $V_{sec}=V_{pri}-V_{delta2}$, auxiliary transformer 14/1 is short circuited
6. $V_{sec}=V_{pri}+V_{delta1}+V_{delta2}$
7. $V_{sec}=V_{pri}+V_{delta1}-V_{delta2}$
8. $V_{sec}=V_{pri}-V_{delta1}+V_{delta2}$
9. $V_{sec}=V_{pri}-V_{delta1}-V_{delta2}$ An added value of using two auxiliary transformers 14/1 and 14/2 in power converter 110 compared to using a single auxiliary transformer 14 in power converter 40 one is that more voltage levels are available, nine voltage levels are available in power converter 110 compared to three voltage levels in power converter 40 (FIG. 4) and as the total power rating of the two auxiliary transformer is equal to the rating of a single transformer the weight and price of the magnetic cores of the auxiliary transformers is similar to a single core of auxiliary transformer 14 in power converter 40.

It is also possible to connect any number n of transformers 14/1 . . . 14/n in the same way with each additional auxiliary transformer 14 adding voltage levels proportionally with $n^3$ with the number n of auxiliary transformers 14/1 . . . 14/n.

As an example in a power converter system with n=3 auxiliary transformers 14/1, 14/2 and 14/3, 27 voltage levels may be attained (assuming auxiliary transformers 14/1, 14/2 and 14/3 are not identical) with each auxiliary transformer 14/n either disconnected, adding a voltage or subtracting a voltage, depending on switches 16.

As previously described in the context of FIGS. 1B, 2, 3,6, and 7, auxiliary transformers (and switches 16) may generally be replaced by high frequency switched-mode bidirectional power converters 12, so that three or more switched-mode bidirectional power converters 12 may be configured similarly as shown in FIG. 11 to similarly achieve a larger number of attainable voltage levels.

Figure 12:
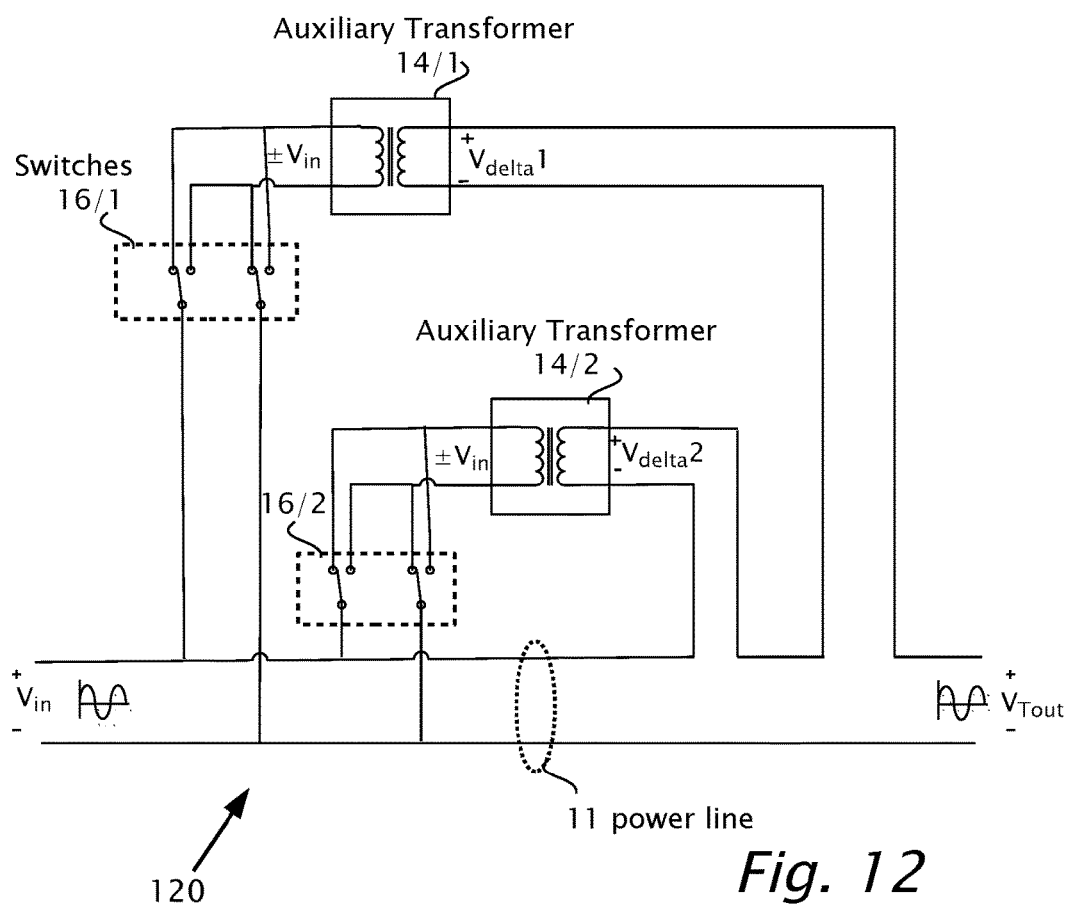
FIG. 12 illustrates a power line adjustment system, according to further features of the present invention.

Reference is now made to FIG. 12 which illustrates a system 120 of two auxiliary transformers 14/1 and 14/2 as shown in FIG. 11, applied directly to a high voltage power line 11 without use of transformer 10. Respective inputs of auxiliary transformers 14/1 and 14/2 are parallel connected to power line 11, optionally through switches 16/1 and 16/2 respectively. Inputs of auxiliary transformers 14/1 and 14/2 present a finite impedance so that a relatively small amount of power is diverted from power line 10. Respective outputs of auxiliary transformers 14/1 and 14/2 are series-connected to power line.

Total output voltage $V_{tout}$ from power line 10 compared with input voltage $V_{in}$ is:

$$V_{Tout}=V_{in}\pm V_{delta1}\pm V_{delta2} \quad (15)$$

An option for connection in system 120 is to connect to high voltage $V_{in}$ on the input side in parallel, and low output voltage $V_{Tout}$, e.g. 400 Volts on the output side connected in series. The terms "input" and "output" in system 120 are used with consistency with description of other systems including a power transformer 10 or switched-mode AC/AC converter 12, however it readily seen that system 120 may function in a bidirectional manner and the terms "input" and "output" may no longer retain their usually meaning.

It is readily understood that in alternative embodiments of the present invention, respective inputs of auxiliary transformers 14/1 and 14/2 are series connected to power line 11, optionally through switches 16/1 and 16/2 respectively and respective outputs of auxiliary transformers 14/1 and 14/2 are parallel-connected to power line.

It is further understood that in other embodiments of the present invention, systems similar to system 120 may be used in which AC/AC switched-mode power converters are used to replace auxiliary transformers 14/1 and 14/2.

Figure 13:
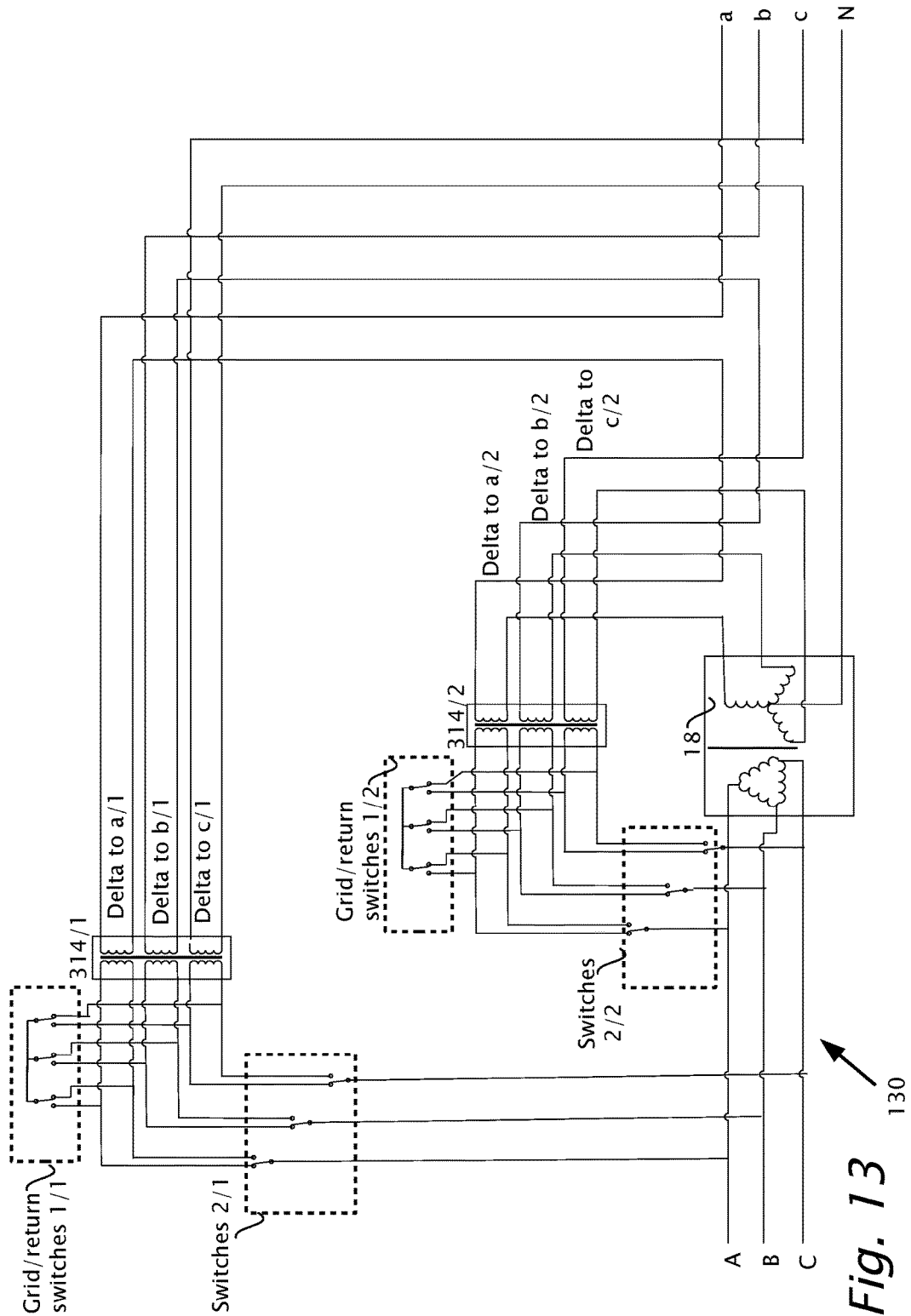
FIG. 13 illustrates a power converter with configuration similar to that of FIG. 8, with two three-phase auxiliary transformers, according to further features of the present invention.

Reference is now made to FIG. 13 which illustrates a system 130, according to further features of the present invention, with configuration similar to that of system 80 (FIG. 8), but with two three-phase auxiliary transformers. Power converter 130 includes three-phase transformer 18 shown in a Delta/Star configuration. The primary of three-phase transformer 18 is shown wired in a Delta configuration and the secondary is shown wired in a Star configuration. The primary leads are referenced A,B and C. Secondary leads are labelled a,b, c and neutral lead N.

Two three phase auxiliary transformer 314/1 and 314/2 are shown each with three primary coils and three secondary coils. Primary leads A,B and C connect with primary coils of transformer 314/1 through switches 1/1 and switches 2/1. Primary leads A,B and C connect with primary coils of transformer 314/2 through switches 1/2 and switches 2/2.

As previously described in the context of system 80, the switches connect one of the two input leads of the primary coils to respective high-voltage primary leads A,B and C. The input leads of the primary coils not connected to any of high-voltage primary leads A,B and C are interconnected to provide grid return.

Secondary coils of transformer 314/1 are series-connected respectively to secondary leads a,b and c respectively so that voltage outputs from secondary coils provide adjustments delta to a/1, delta to b/1, delta to c/1 respectively to total output voltages on secondary leads a,b, and c. Similarly, secondary coils of transformer 314/2 are series-connected respectively to secondary leads a,b and c respectively so that voltage outputs from secondary coils provide adjustments delta to a/2, delta to b/2, delta to c/2 respectively to total output voltages on secondary leads a,b, and c.

The adjustments may be individually positive or negative dependent on the state of switches as described above in the context of system 80. The adjustment may be zero when primary coils are not connected to a respective high-voltage primary lead A,B and C.

The terms "grid", "power grid" and "electrical power grid" are used herein interchangeably.

The terms "grid voltage" and "mains voltage" are used herein interchangeably.

The term "transformer" as is an electrical device that transfers electrical energy between two or more circuits through electromagnetic induction to increase or decrease the alternating voltages in electric power applications. A varying current in the transformer's primary winding creates a varying magnetic flux in the transformer core and a varying field impinging on the transformer's secondary winding. Power transformers may include two main active parts: the core, which is made of high-permeability, grain-oriented, usually silicon electrical steel, layered in pieces; and windings, which are made of copper conductors wound around the core, providing electrical input and output. Two basic configurations of core and windings exist, the core form and the shell form. In the usual shell-type power transformer, both primary and secondary are on one leg and are surrounded by the core, whereas in a core-type power transformer, cylindrical windings cover the core legs.

The term "primary leads" as used herein refer to electrical leads connected to a transformer's primary winding.

The term "secondary leads" as used herein refer to electrical leads connected to a transformer's second winding.

The term "series connection" as used herein, in the context of two or more electrical components, is an electrical connection in which the current through each of the components is the same, and the voltage across the connection is the sum of the voltages across each component The term "parallel connection" as used herein in the context of parallel electrical connection of two or more components, is an electrical connection in which the voltage across each of the components is the same, and the total current is the sum of the currents through each component.

The term "anti-parallel" connection as used herein is a kind of parallel connection as defined above of two components but with the leads of one of two components reversed.

The term "AC/AC switched-mode power converter" as used herein refers to a circuit for converting AC electrical power at an input root-mean-square (RMS) voltage to an output RMS alternating current voltage across a load. The AC/AC switched-mode power converter may be implemented as (but not limited to): AC Voltage Controllers, or AC Regulators. Control methods include but not limited to: ON/OFF Control, Phase-Angle Control, Pulse Width Modulation (PWM) and/or AC Chopper Control. These methods may be implemented in single-phase circuits and three-phase circuits. Cycloconverters may be used in AC/AC conversion. Cycloconverters are commutated direct frequency converters that are synchronised by a supply line. Matrix converters utilize bi-directional, bipolar switches. A single phase to a single phase matrix converter includes a matrix of 9 switches connecting the three input phases to the tree output phase. An input phase and an output phase may be connected together at a time without connecting any two switches from the same phase at the same time; otherwise this will cause a short circuit of the input phases. Matrix converters are subdivided into two types: direct and indirect converters. A direct matrix converter with three-phase input and three-phase output, the switches in a matrix converter must be bi-directional, that is, they must be able to block voltages of either polarity and to conduct current in either direction. This switching strategy permits the high output voltage and reduces the reactive line-side current. The power flow through the converter is reversible. Indirect matrix converters use separate input and output sections that are connected through a DC link without storage elements. DC Link Converters, also referred to as AC/DC/AC converters, convert an AC input to an AC output with the use of a DC link in the middle. The power in the converter is converted to DC from AC with the use of a rectifier, and then converted back to AC from DC with the use of an inverter. The end result is an output with a lower voltage and variable (higher or lower) frequency. Hybrid matrix converters may combine an AC/DC/AC design with the matrix converter design.

The term "power converter" or "AC/AC power converter" as used herein refers to either an AC/AC switched-mode power converter and/or a transformer.

The term "total alternating voltage output" in reference to sensing voltage refers to at least one of root-mean-square, unipolar peak voltage, peak-to-peak voltage and/or any other voltage metric.

The term "add" or "sum" as used herein refers to adding voltage between a series connected components is vectorial addition taking account the phases of the electrical power being added.

The transitional term "comprising" as used herein is synonymous with "including", and is inclusive or open-ended and does not exclude additional, unrecited elements or method steps. The articles "a", "an" is used herein, such as "an auxiliary transformer" or "a sensor" have the meaning of "one or more" that is "one or more auxiliary transformers", "one or more sensors".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The invention claimed is:

1. A system for controlling grid voltage in a power grid, the system comprising:
   a power line with input leads and output leads, wherein the power line carries alternating current (AC) electrical power between the input and output leads;
   a first auxiliary AC/AC power converter with first input conductors and first output conductors, wherein the first auxiliary AC/AC power converter is configured to convert input AC electrical power at the first input conductors to output AC electrical power at the first output conductors, wherein the first auxiliary AC/AC power converter is configured to convert less electrical power than the AC electrical power carried by the power line;
   a second auxiliary AC/AC power converter with second input conductors and second output conductors, wherein the second auxiliary AC/AC power converter is configured to convert input AC electrical power at the second input conductors to output AC electrical power at the second output conductors, wherein the second auxiliary AC/AC power converter is configured to convert less electrical power than the AC electrical power carried by the power line;
   wherein the first input conductors and the second input conductors respectively of the first and second auxiliary AC/AC power converters are parallel-connected to the input leads of the power line;
   wherein the output leads of the power line are series-connected to the output conductors of the first and second auxiliary AC/AC power converters;

wherein the output alternating voltages of the first and second input auxiliary AC/AC power converters add to the output alternating voltage of the power line to control the grid voltage in the power grid.

2. The system of claim 1, wherein the first and second auxiliary AC/AC power converters are auxiliary transformers and wherein the first and second input conductors of the auxiliary transformers are connectable through a respective plurality of first and second switches to the input leads of the power line.

3. The system of claim 1, wherein the first and second auxiliary AC/AC power converters are switched-mode AC/AC power converters configurable to invert the output alternating voltages relative to the respective input alternating voltages or non-invert output alternating voltages relative to the respective input alternating voltages.

4. The system of claim 1, wherein the first and second auxiliary AC/AC power converters are switched-mode AC/AC converters configurable to shift by 180 degrees output phase of the AC electrical power at the output conductors relative to input phase of the AC electrical power at the input conductors.

5. The system of claim 1, further comprising:
a sensor configured to sense at least one sensed electrical parameter output after the series-connection of the output leads of the power line to the output conductors of the first and second auxiliary AC/AC power converter, wherein the at least one sensed electrical output parameter is selected from the group consisting of: total output alternating voltages of the first and second auxiliary AC/AC power converters summed with the output alternating voltage of the power line, current and phase.

6. The system of claim 5, further comprising:
a control module operatively connected to the sensor, wherein the control module is configured to provide a control signal to the first and second auxiliary AC/AC power converters responsive to the at least one sensed parameter.

7. A method for controlling grid voltage in a power grid in a system including a power line with input leads and output leads, wherein the power line carries alternating current (AC) electrical power between the input and output leads;
providing a first auxiliary AC/AC power converter with first input conductors and first output conductors;
converting input AC electrical power at the first input conductors to output AC electrical power at the first output conductors, wherein the first auxiliary AC/AC power converter is configured to convert less electrical power than the AC electrical power carried by the power line;
providing a second auxiliary AC/AC power converter with second input conductors and second output conductors;
converting input AC electrical power at the second input conductors to output AC electrical power at the second output conductors, wherein the second auxiliary AC/AC power converter is configured to convert less electrical power than the AC electrical power carried by the power line;
parallel-connecting the input conductors of the first and second auxiliary AC/AC power converters to the input leads of the power line;
series-connecting the output leads of the power line to the output conductors of the first and second auxiliary AC/AC power converters;
controlling grid voltage by adding the output alternating voltage of the first and second auxiliary AC/AC power converters to the output alternating voltage of the power line.

8. The method of claim 7, wherein the first and second auxiliary AC/AC power converters are auxiliary transformers, the method further comprising:
connecting the first and second input conductors of the respective first and second auxiliary transformers through a respective plurality of first and second switches to the input leads of the power line.

9. The method of claim 7, wherein the first and second auxiliary AC/AC power converters are switched-mode AC/AC power converters, the method further comprising:
inverting output alternating voltage relative to the input alternating voltage or non-inverting output alternating voltage relative to input alternating voltage.

10. The method of claim 7, wherein the first and second auxiliary AC/AC power converters are switched-mode AC/AC converters, the method further comprising:
shifting by 180 degrees output phase of the AC electrical power at the first and second output conductors relative to input phase of the AC electrical power at the first and second input conductors.

11. The method of claim 7, further comprising:
sensing at least one sensed electrical parameter output after the series-connection of the output leads of the power line to the first and second output conductors respectively of the first and second auxiliary AC/AC power converters, wherein the at least one sensed electrical output parameter is selected from the group consisting of: total output alternating voltages of the first and second auxiliary AC/AC power converters summed with the output alternating voltage of the power line, current and phase.

12. The method of claim 11, further comprising:
providing a control signal to the first and second auxiliary AC/AC power converters responsive to the at least one sensed parameter.

* * * * *